(12) United States Patent
Agostini

(10) Patent No.: US 11,788,596 B2
(45) Date of Patent: Oct. 17, 2023

(54) ENERGY ABSORPTION THROUGH MASS REDISTRIBUTION AND MAGNETIC MANIPULATION

(71) Applicant: Scott C. Agostini, San Juan Capistrano, CA (US)

(72) Inventor: Scott C. Agostini, San Juan Capistrano, CA (US)

( * ) Notice: Subject to any disclaimer, the term of this patent is extended or adjusted under 35 U.S.C. 154(b) by 0 days.

(21) Appl. No.: 17/496,983

(22) Filed: Oct. 8, 2021

(65) Prior Publication Data

US 2022/0112932 A1 Apr. 14, 2022

Related U.S. Application Data

(60) Provisional application No. 63/091,437, filed on Oct. 14, 2020.

(51) Int. Cl.
*F16F 7/10* (2006.01)
*G01L 5/00* (2006.01)

(52) U.S. Cl.
CPC .......... *F16F 7/1011* (2013.01); *G01L 5/0052* (2013.01); *F16F 2222/08* (2013.01); *F16F 2230/0047* (2013.01); *F16F 2230/18* (2013.01)

(58) Field of Classification Search
CPC .................................................... F16F 7/1011
See application file for complete search history.

(56) References Cited

U.S. PATENT DOCUMENTS

| | | | | |
|---|---|---|---|---|
| 2006/0059990 | A1* | 3/2006 | Simonenko | G01P 15/0888 73/514.16 |
| 2015/0239554 | A1* | 8/2015 | Birchette | B64C 25/60 244/104 FP |
| 2018/0154850 | A1* | 6/2018 | Yates | G08G 1/166 |

FOREIGN PATENT DOCUMENTS

| | | | | |
|---|---|---|---|---|
| CN | 103111492 | A * | 5/2013 | |
| CN | 105715733 | A * | 6/2016 | |
| CN | 106986006 | A * | 7/2017 | ............ B64C 25/12 |
| CN | 107054629 | A * | 8/2017 | |
| CN | 111294444 | A * | 6/2020 | |
| DE | 102016101552 | A1 * | 8/2017 | |
| EP | 2394068 | B1 * | 6/2013 | ............ F16D 37/02 |
| JP | H083795 | Y2 * | 1/1996 | |
| WO | WO-2012104470 | A1 * | 8/2012 | ............ F16F 7/1011 |

* cited by examiner

*Primary Examiner* — Melody M Burch

(74) *Attorney, Agent, or Firm* — STETINA BRUNDA GARRED AND BRUCKER

(57) ABSTRACT

An energy absorption system, for absorbing an impact energy imparted to a subject upon landing on a surface, includes a mass containment vessel fixed to the subject and a plurality of electromagnets disposed at fixed positions relative to the mass containment vessel. The mass containment vessel may contain one or more mass elements movably disposed therein. A controller may be configured to charge one or more of the electromagnets upon an impact of the subject with the surface to move the mass element(s) toward the surface by electromagnetic force. Alternatively, the energy absorption system may include a pulley system operable to mechanically move one or more mass elements along an axis, a multi-axis joint connecting the pulley system to the subject, and a controller configured to operate the pulley system upon an impact of the subject with the surface to mechanically move the mass element(s) toward the surface.

11 Claims, 6 Drawing Sheets

ENERGY ABSORPTION THROUGH MASS REDISTRIBUTION AND MAGNETIC MANIPULATION

CROSS-REFERENCE TO RELATED APPLICATIONS

This application relates to and claims the benefit of U.S. Provisional Application No. 63/091,437, filed Oct. 14, 2020 and entitled "Energy Absorption Through Mass Redistribution And Magnetic Manipulation," the entire contents of which is wholly incorporated by reference herein.

STATEMENT RE: FEDERALLY SPONSORED RESEARCH/DEVELOPMENT

Not Applicable

BACKGROUND

A rover or other outer space vehicle or lander has a tendency to bounce upon landing inside a micro-gravity environment such as on an asteroid. This is due to the kinetic impact energy imparted to the rover by the landing surface. It is warranted that a device by which to absorb this impact energy would be applicable to this scenario on a broad scale to many such rovers of any size and type.

BRIEF SUMMARY

The present disclosure contemplates various systems, methods, and apparatuses for overcoming the above drawbacks accompanying the related art. One aspect of the embodiments of the present disclosure is an energy absorption system for absorbing an impact energy imparted to a subject upon landing on a surface. The energy absorption system may comprise a mass containment vessel fixed to the subject and a plurality of electromagnets disposed at fixed positions relative to the mass containment vessel. The mass containment vessel may contain one or more mass elements movably disposed therein. The energy absorption system may further comprise a controller configured to charge one or more of the plurality of electromagnets upon an impact of the subject with the surface to move the one or more mass elements toward the surface by electromagnetic force.

The energy absorption system may comprise one or more distance sensors arranged to measure a distance between the subject and the surface. The controller may be configured to charge the one or more electromagnets according to the distance measured by the one or more distance sensors. The controller may be configured to determine a direction of the impact based on the distance measured by the one or more distance sensors and, upon the impact, charge the one or more electromagnets to move the one or more mass elements in the direction of the impact. The controller may be configured to determine an optimal arrangement of the one or more mass elements within the mass containment vessel based on the distance measured by the one or more distance sensors prior to the impact of the subject with the surface and charge one or more of the plurality of electromagnets to move the one or more mass elements to the optimal arrangement prior to the impact. The controller may determine the optimal arrangement based on a velocity of the subject relative to the surface and an angle of impact of the subject with the surface as determined from the distance measured by the one or more distance sensors prior to the impact. The one or more distance sensors may include at least one optical sensor, e.g., a laser sensor. The one or more distance sensors may include at least one sonar sensor.

The energy absorption system may comprise one or more force sensors. The controller may be configured to determine a timing of the impact according to a force measured by the one or more force sensors. The one or more force sensors may comprise at least one strain gauge.

The electromagnets may be disposed on two orthogonal axes passing through the mass containment vessel. On each of the two orthogonal axes, the plurality of electromagnets may include a pair of electromagnets disposed on opposite sides of the mass containment vessel. The electromagnets may be disposed on three mutually orthogonal axes passing through the mass containment vessel. On each of the three mutually orthogonal axes, the plurality of electromagnets may include a pair of electromagnets disposed on opposite sides of the mass containment vessel.

The electromagnets may be disposed on one or more outer walls of the mass containment vessel.

The electromagnets may be disposed on one or more inner walls of the mass containment vessel.

The one or more mass elements may comprise a plurality of magnetic solids.

The one or more mass elements may comprise a magnetic fluid.

Another aspect of the embodiments of the present disclosure is an energy absorption system for absorbing an impact energy imparted to a subject upon landing on a surface. The energy absorption system may comprise one or more mass elements, a pulley system operable to mechanically move the one or more mass elements along an axis, a multi-axis joint connecting the pulley system to the subject, and a controller configured to operate the pulley system upon an impact of the subject with the surface to mechanically move the one or more mass elements toward the surface.

Another aspect of the embodiments of the present disclosure is a method of absorbing an impact energy imparted to a subject upon landing on a surface. The method may comprise measuring a distance between the subject and the surface and, prior to an impact of the subject with the surface, moving one or more mass elements to an optimal arrangement based on the measured distance. The method may further comprise, upon the impact of the subject with the surface, moving the one or more mass elements toward the surface.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems, methods, and apparatuses for absorbing an impact energy imparted to a subject such as a space rover upon landing on a surface. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1A:
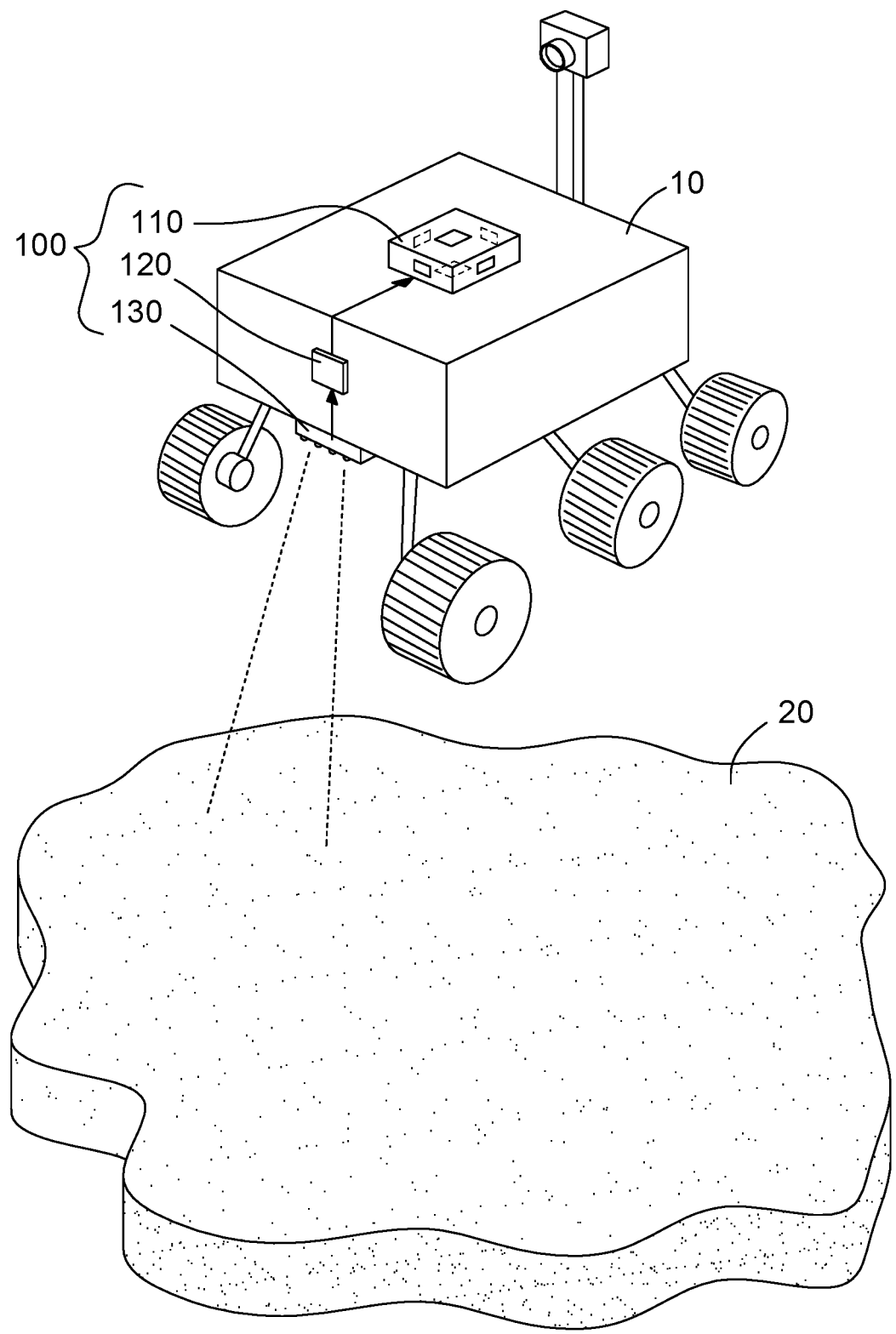
FIG. 1A shows an energy absorption system installed on a rover approaching a landing surface.
Figure 1B:
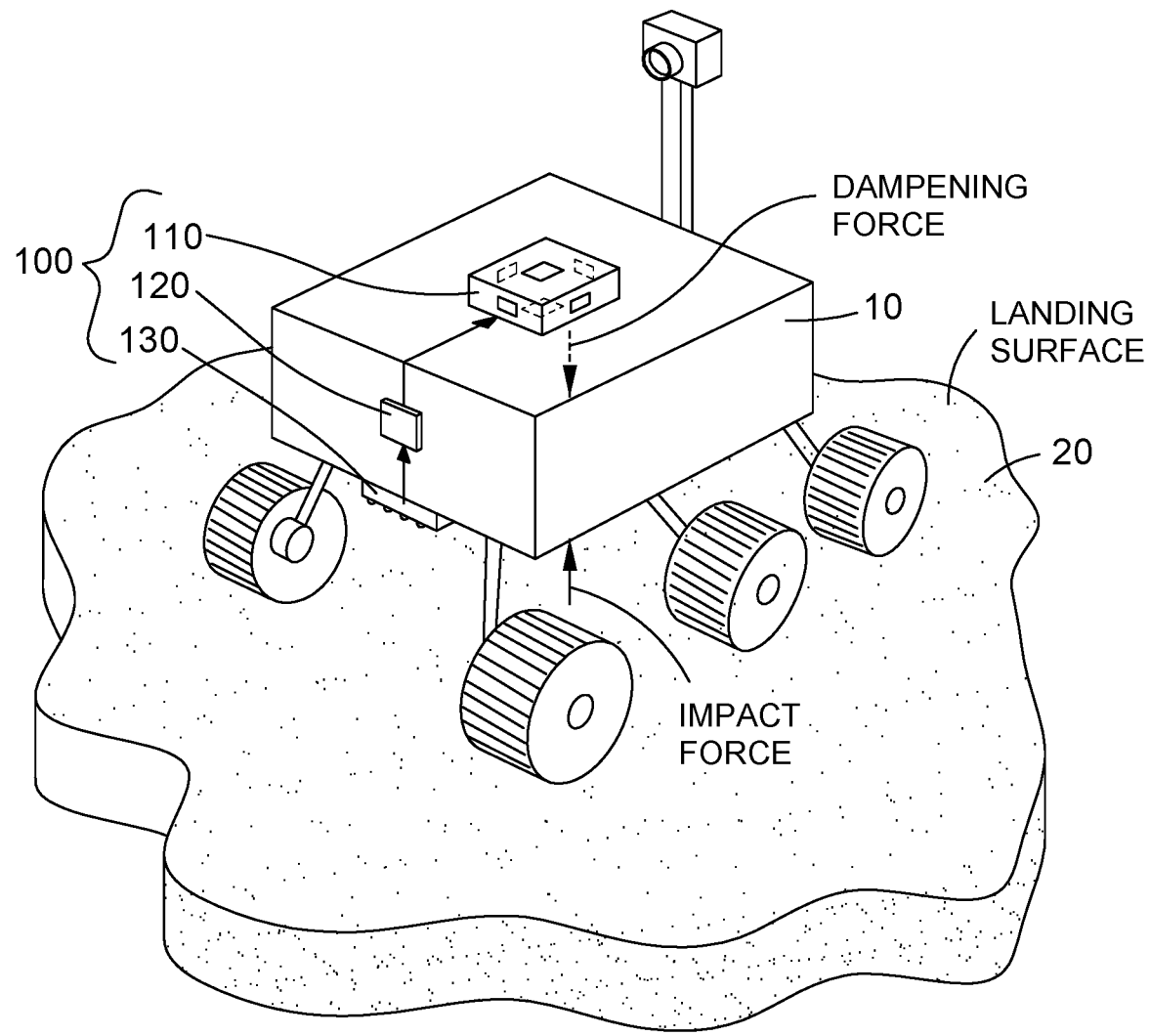
FIG. 1B shows the energy absorption system at the moment of impact of the rover with the landing surface.

FIG. 1A shows an energy absorption system 100 according to an embodiment of the present disclosure. The energy absorption system 100 may be installed on a subject 10 such as a rover or other outer space vehicle or lander. As described herein, the energy absorption system 100 may be operable to absorb an impact energy imparted on the subject 10 upon landing on a surface 20 in a micro-gravity environment such as the surface of an asteroid. In FIG. 1A, the subject 10 is shown approaching the landing surface 20. FIG. 1B shows the same energy absorption system 100 at the moment of impact of the subject 10 with the landing surface 20. At the moment of impact (FIG. 1B), a mass containment vessel 110 of the energy absorption system 100 may impart a dampening force (downward arrow) on the subject 10 to counter the impact force (upward arrow) that is imparted on the subject 10 by the surface 20. The dampening force may be generated according to commands issued by a controller 120 (e.g., an integrated circuit including a microprocessor), which may be based on measurements received from one or more sensors 130.

Figure 2:
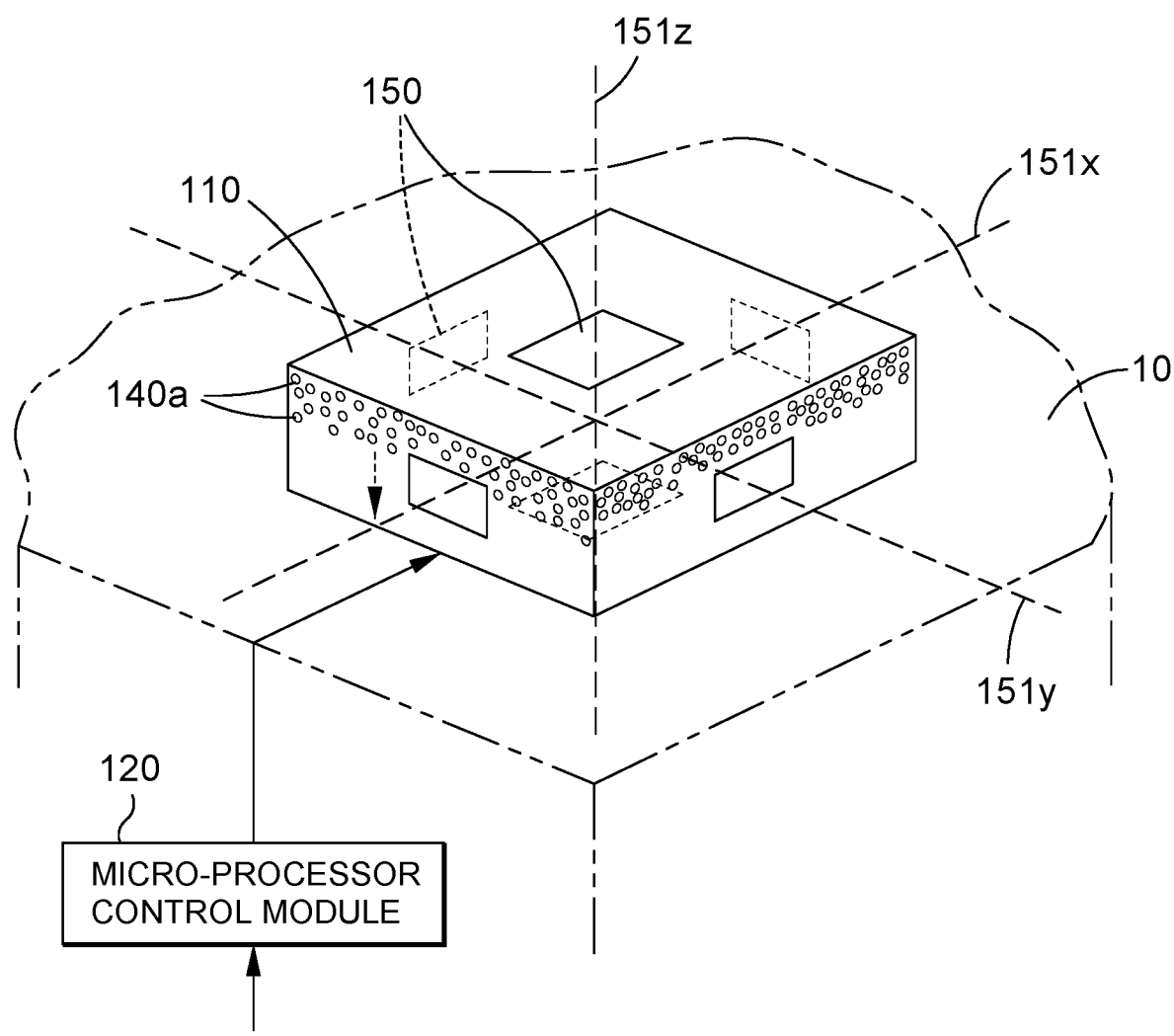
FIG. 2 is a closeup view of a mass containment vessel of the energy absorption system.

FIG. 2 is a closeup view of the mass containment vessel 110. The mass containment vessel 110 may be fixed to the subject 10, either by being attached to the outside thereof as shown or by being installed within the subject 10, and may take any geometric shape that is suitable for the particular application, such as a hollow cylinder, sphere, or rectangular prism as depicted. As shown in FIG. 2, the mass containment vessel 110 may contain one or more mass elements 140a movably disposed therein. The mass element(s) 140a, which are shown as a plurality of particles in FIG. 2, may be made of any material, particularly those materials that are attracted to electromagnetic fields, have high kinetic energy absorption characteristics, are resilient to the harsh environments of space (e.g., radiation exposure and extreme temperature fluctuations), are able to withstand numerous cycles including impacts (e.g., 10 or more), and are able to move freely within the confines of the geometric shape defined by the mass containment vessel 110. Examples of suitable mass element(s) 140a may include spheres and/or sand made of steel, nickel, cobalt, neodymium, iron, magnetite, and/or maghemite.

In order to be able to freely move the mass element(s) 140a to generate the dampening force, the energy absorption system 100 may further include a plurality of electromagnets 150 as shown, which may be disposed at fixed positions relative to the mass containment vessel 110 (e.g., on one or more outer or inner walls thereof). The electromagnets 150 may be disposed on two or more mutually orthogonal axes passing through the mass containment vessel 110, such that a pair of electromagnets 150 is disposed on opposite sides of the mass containment vessel 110 on each axis. In the illustrated embodiment, for example, six electromagnets 150 are provided, divided into three pairs, two on an x-axis 151x, two on a y-axis 151y, and two on a z-axis 151z, with the axes 151x, 151y, and 151z being mutually orthogonal and passing through the center of the mass containment vessel 110. In this way, each of the three pairs of electromagnets 150 may straddle the mass containment vessel 110 in a different orthogonal direction, allowing for electromagnetic force to be applied to the mass element(s) 140a in a wide variety of directions (and ideally in any direction). The controller 120 may issue commands in the form of output currents to the electromagnets 150, causing the electromagnets 150 to generate magnetic fields that move the mass element(s) 140a to the desired positions and at the desired velocities within the mass containment vessel 110 by electromagnetic force. As the mass element(s) 140a strike the walls of the mass containment vessel 110, which is fixed to the subject 10, the mass containment vessel 110 imparts a force on the subject 10 that wholly or partly cancels the impact force imparted on the subject 10 by the surface 20.

In this way, the energy absorption system 100 may function similarly to a dead-blow mallet or hammer, which uses an internal shot or other particulate to impart a dampening force on the mallet as the mallet strikes a target. However, unlike a conventional dead-blow mallet, which relies on the motion of the user's upswing to position the particulate and has limited application in space due to the tendency of the particulate to drift in a micro-gravity environment, the energy absorption system 100 may allow for a high degree of control over the mass element(s) 140a to produce a reliable dampening force for a variety of different impact directions and velocities.

Figure 3:
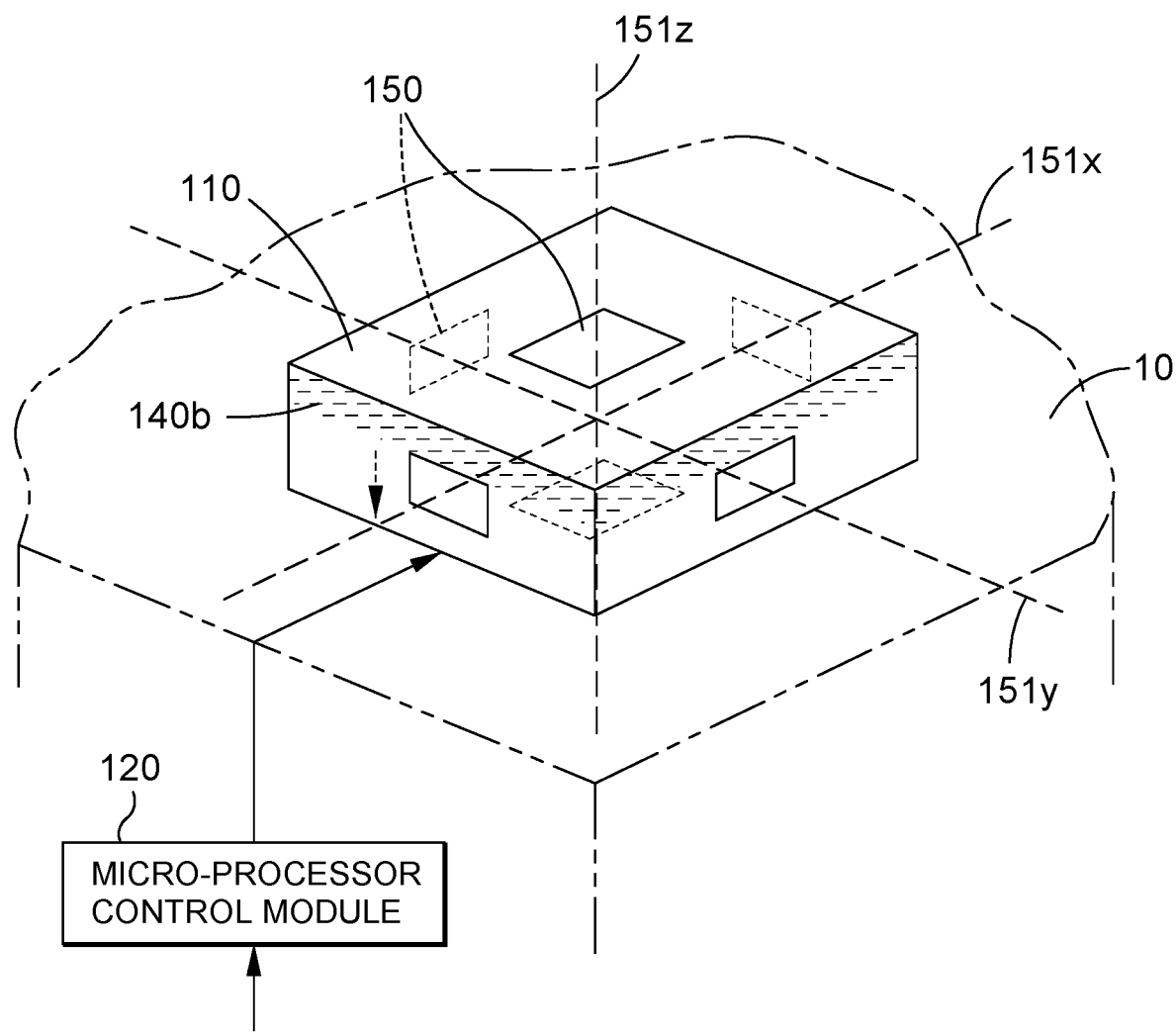
FIG. 3 is another closeup view of the mass containment vessel according to an alternative embodiment.

FIG. 3 is another closeup view of the mass containment vessel 110 according to an alternative embodiment. In the example of FIG. 3, the mass element(s) 140a of FIG. 2, which were described as being magnetic solid(s), are replaced with a mass element 140b that is a magnetic fluid. The magnetic fluid may otherwise have the same characteristics as the magnetic solid(s) and may be, for example, particles of magnetic materials such as steel, nickel, cobalt, neodymium, iron, magnetite, and/or maghemite dispersed in a base fluid such as water or an organic solvent. The particles may be sufficiently small (e.g. 15 nm or less) for the ferrofluid to behave homogeneously.

Figure 4:
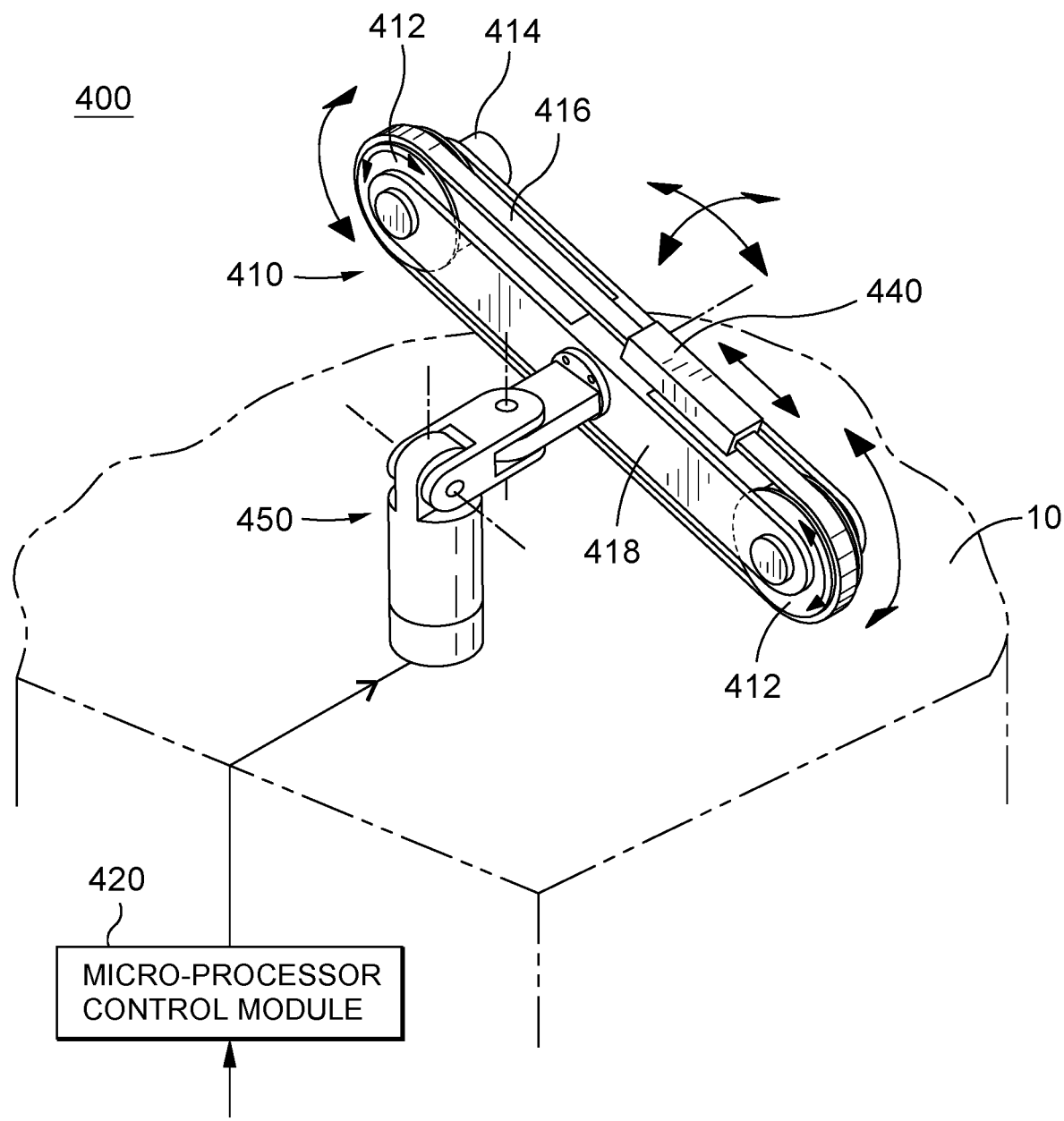
FIG. 4 is a closeup view of another energy absorption system.

FIG. 4 is a closeup view of another energy absorption system 400, which may be installed on the rover or other subject 10 in place of the energy absorption system 100 and may similarly absorb an impact energy imparted on the subject 10 upon landing on a surface 20 in a micro-gravity environment such as the surface of an asteroid. Like the energy absorption system 100, the energy absorption system 400 may impart a dampening force on the subject 10 to counter the impact force that is imported on the subject 10 by the surface 20 at the moment of impact. The dampening force may similarly be generated according to commands issued by a controller 420, which may be the same as the controller 120 except as described herein, and the commands may likewise be issued according to measurements received from one or more sensors 130 (see FIGS. 1A and 1B). The energy absorption system 400 may differ from the energy absorption system 100 in that, unlike the one or more mass elements 140a, 140b described above, the corresponding one or more mass elements 440 of the energy absorption system 100 may be moved mechanically rather than by electromagnetic force.

Instead of a mass containment vessel 110, the energy absorption system 400 may include a pulley system 410 that is operable to mechanically move the one or more mass elements 440 along an axis. As shown in FIG. 4 by way of example, the pulley system 410 may include two pulleys 412, one of which is driven by a motor 414 (e.g., an electric motor), to guide a belt 416 forward or backward along the axis of the pulley system 410. The mass element(s) 440 may be attached to the belt 416, such that the driving of the pulleys 412 by the motor 414 causes the mass element(s) 440 to move forward and backward with the belt 416. A body 418 of the pulley system 410 may be connected to the subject 10 by a multi-axis joint 450, which may allow the pulley system 410 to be positioned in any arbitrary position (e.g., with adjustable yaw, pitch, and roll) relative to the subject 10. In particular, the multi-axis joint 450 may be adjusted, in accordance with a command issued by the controller 420, such that the axis of the pulley system 410 (i.e. the axis along which the mass element(s) 440 moves) is aligned with the direction of impact. In this way, the mass element(s) 440 can be moved toward the surface 10 at the moment of impact to impart a force on the subject 10 that wholly or partly cancels the impact force imparted on the subject 10 by the surface 20.

Figure 5:
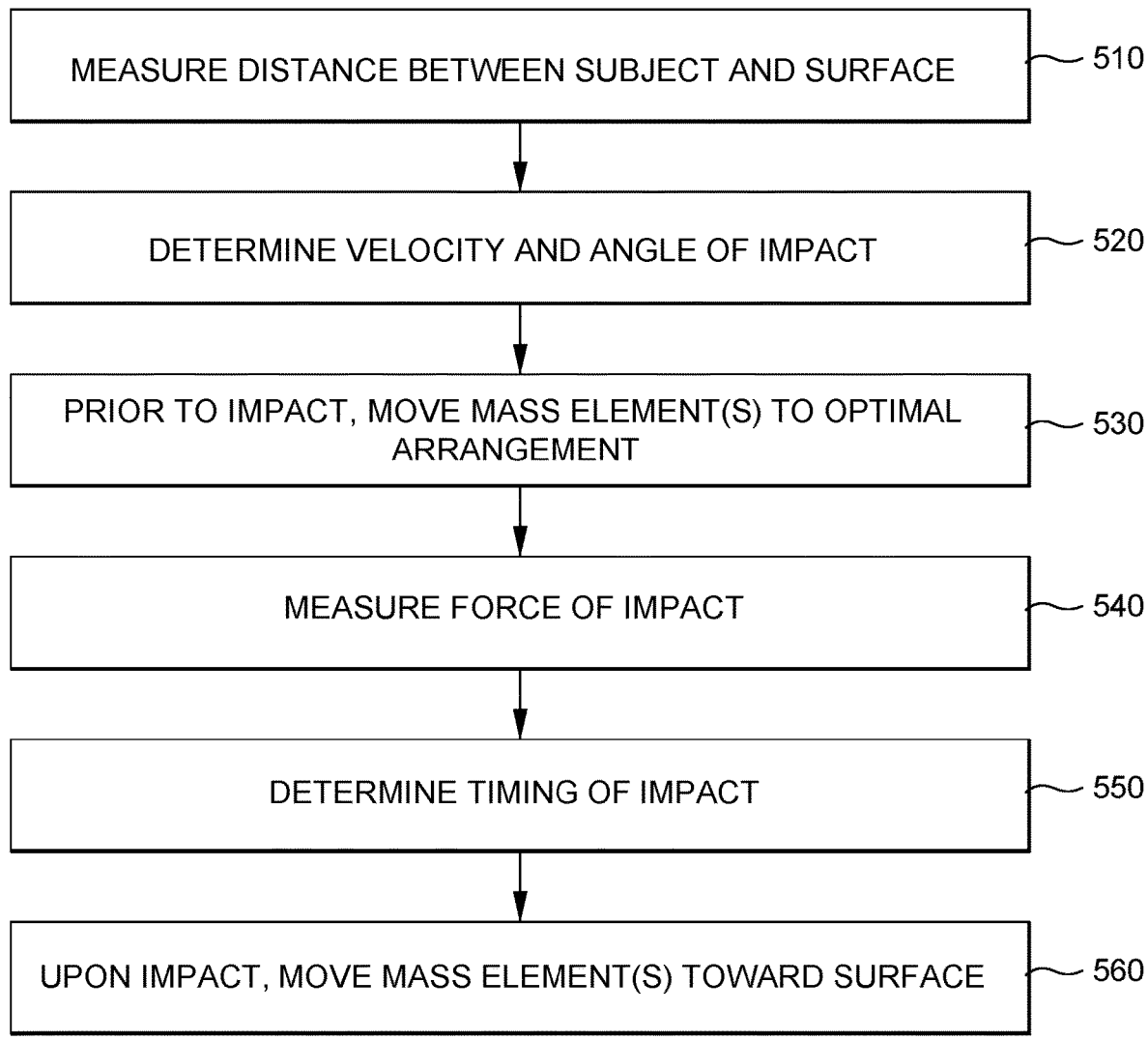
FIG. 5 shows an operational flow for absorbing an impact energy according to an embodiment of the present disclosure.

FIG. 5 shows an operational flow for absorbing an impact energy imparted to a subject 10 (e.g., a rover) upon landing on a surface 20. The operational flow may be performed by either the energy absorption system 100 or the energy absorption system 400 described herein, for example, which may be installed on the subject 10 as shown in FIGS. 1-4. The operational flow may begin with measuring the distance between the subject 10 and the surface 20 as the subject 10 approaches the surface 20 (step 510). For example, one or more sensors 130 of the energy absorption system 100, 400 may take a plurality of distance measurements as the subject 10 approaches the surface 20. To this end, the one or more sensors 130 may include radar sensors, sonar sensors, optical sensors such as laser sensors, and/or other sensors for measuring the distance between the subject 10 and the approaching surface 20. Based on the measurement results, the velocity of the subject 10 relative to the surface 20 and the angle of impact can be determined (step 520). For example, the controller 120, 420 may be configured to determine the velocity and/or the direction of impact based on the distance measured by the one or more sensors 130, such as by extrapolating from a plurality of measurements taken at different times during the approach. It is also contemplated that the orientation of the subject 10 may be measured, for example, using one or more gyroscopes from among the sensor(s) 130, which may additionally be used in the determination of the direction of impact.

The operational flow of FIG. 5 may continue with moving the mass element(s) 140a, 140b, 440 to an optimal arrangement prior to the impact of the subject 10 with the surface 20 (step 530). The controller 120, 420 may determine the optimal arrangement based on the distance measured by the one or more sensors 130, for example. In particular, the optimal arrangement may be based on the velocity of the subject 10 relative to the surface and the angle of impact of the subject 10 with the surface 20 as may be determined in step 520. In general, the optimal arrangement will position the mass element(s) 140a, 140b, 440 as far as possible from the surface 20 as the subject 10 approaches the surface 20, so as to allow for their greatest possible movement in the direction toward the surface 20 upon impact. In the case of the energy absorption system 100, for example, the solid mass elements(s) 140a or liquid mass element(s) 140b may moved to the farthest reaches of the mass containment vessel 110 relative to the approaching surface 20. Depending on the angle of impact, this may not necessarily be the top of the mass containment vessel 110 shown in FIGS. 1A, 1B, 2, and 3, as the rover or other subject 10 may approach the surface 20 at an angle (e.g., in a tilted state), making the optimal position a corner of the mass containment vessel 110, for example. In the case of the energy absorption system 400 of FIG. 4, the controller 420 may arrange the mass element(s) 440 at the optimal position by a combination of articulating the multi-axis joint 450 and driving the pulley system 410 using the motor 414, such that the pulley system 410 is arranged in the direction of impact and the mass element(s) 440 is as far from the surface 20 as possible prior to impact. Note that the commands issued by the controller 420 may travel via wires disposed in the multi-axis joint 450 and in the body 418 of the pulley system 410. As the subject 10 continues to approach the surface 20, the optimal arrangement may be continually updated by the controller 120, 420.

With the mass element(s) 140a, 140b, 440 being in the optimal arrangement, the energy absorption system 100, 400 is ready to most efficiently generate the dampening force upon impact. To this end, the operational flow may include a step of measuring the force of impact (step 540), for example, using one or more force sensors (e.g., a strain gauge) from among the one or more sensors 130. The timing of impact (as well as the direction of impact) can then be accurately determined according to the measured force, such as by the controller 120, 420 comparing the measured force to a threshold to determine whether the impact has occurred (step 550). Alternatively, or additionally, the timing of the impact may be determined based on the distance measurements taken by the sensor(s) 130, in which case step 540 may be omitted. For example, the controller 120, 420 may approximate the timing of the impact based on the velocity and the angle of impact determined in step 520. Upon the impact of the subject 10 with the surface 20, the controller 120, 420 may then move the mass element(s) 140a, 140b, 440 toward the surface 20 to produce the dampening force and thus prevent bouncing of the subject 10 on the surface 20 (step 560). For example, the controller 120 may charge the electromagnets 150 to move the mass element(s) 140a, 140b by electromagnetic force toward the surface 20, thus causing the mass element(s) 140a, 140b to impact the wall(s) of the mass containment vessel 110 and transmit kinetic energy to the subject 10 so as to counter the impact with the surface 20. In the case of the energy absorption system 400, the controller 420 may activate the motor 414 to mechanically move the mass element(s) 440 along the axis of the pulley system 410 (which is already oriented perpendicularly to the surface 20 or otherwise in the direction of impact) toward the surface 20 using the pulleys 412 and belt 416, with the force of the mass element(s) 440 acting on the belt 416 of the pulley system 410 to transmit the kinetic energy to the subject 10 and counter the impact. It is also contemplated that the motor 414 may act as a braking mechanism, producing a rotational torque in the direction of the impact surface 20.

The determination of the velocity of the impact in step 520 and/or the measurement of the force of impact in step 540 may additionally be used to determine the acceleration to be applied to the mass element(s) 140a, 140b, 440 toward the surface 20 at the time of impact. For example, by charging the electromagnets 150 with greater or lesser magnitude, or by driving the pulley system 410 at different speeds, the mass element(s) 140a, 140b, 440 may be caused to accelerate more or less depending on what is needed to cancel the impact force. In this regard, the controller 120, 420 may approximate the impact force by calculating the kinetic energy of the subject 10 using its known mass and determined velocity and may use the angle of impact to determine an overall impact vector force and direction. The acceleration of the mass element(s) 140*a*, 140*b*, 440 to the opposing side of the mass containment vessel 110 or pulley system 410 may effectively increase their kinetic energy based upon the anticipated impact energy calculated by the on-board controller 120, 420. This increase in kinetic energy due to electromagnetic or mechanical force may be useful to lower the overall mass of mass element(s) 140*a*, 140*b*, 440 needed to achieve the same result versus using a larger mass of mass element(s) 140*a*, 140*b*, 440 without this applied acceleration. The amount of time needed for the mass element(s) 140*a*, 140*b*, 440 to travel from the optimal side of the mass containment vessel 110 or pulley system 410 to the opposing side thereof may be taken into account so that the mass element(s) 140*a*, 140*b*, 440 do not impart their kinetic energy too early or too late relative to the impact energy of the subject 10 and its response to the bouncing effect from the landing zone surface 20. The acceleration of the mass element(s) 140*a*, 140*b*, 440 toward the surface 20 may be continued for some period of time after the impact. In this way, the same mass element(s) 140*a*, 140*b*, 440 may be accelerated toward the surface 20 a second time after experiencing a bounce in response to an initial impact, for example, with the continuing acceleration of the mass element(s) 140*a*, 140*b*, 440 in the desired direction canceling out any residual motion of the subject 10.

It is also contemplated that a shifting center of mass of the rover or other subject 10 from the mass element(s) 140*a*, 140*b*, 440 may cause interference with the on-board locomotive systems used in the mission of the subject 10 that enable it to move around on the surface of the asteroid, for example. Therefore, once the subject 10 has come to rest on the landing zone surface 20 with a zero velocity, and depending upon the needs of the rover or other subject's command post located on Earth, the on-board control module computer (e.g. controller 120, 420) may have the option to disable the energy absorption system 100, 400 by polarizing all mass containment vessel(s) 110 and/or mass element(s) 140*a*, 140*b* via the attached electromagnets 150 or adjusting the pulley system 410 to effectively hold all mass element(s) 140*a*, 140*b*, 440 in a fixed position during the subject's planned mission and surface maneuvering.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An energy absorption system for absorbing an impact energy imparted to a subject upon landing on a surface, the energy absorption system comprising:
   one or more mass elements;
   a pulley system operable to mechanically move the one or more mass elements along an axis;
   a multi-axis joint connecting the pulley system to the subject; and
   a controller configured to operate the pulley system upon an impact of the subject with the surface to mechanically move the one or more mass elements toward the surface.

2. The energy absorption system of claim 1, further comprising one or more distance sensors arranged to measure a distance between the subject and the surface, wherein the controller is configured to operate the pulley system according to the distance measured by the one or more distance sensors.

3. The energy absorption system of claim 2, wherein the controller is configured to determine a direction of the impact based on the distance measured by the one or more distance sensors and, upon the impact, operate the pulley system to move the one or more mass elements in the direction of the impact.

4. The energy absorption system of claim 2, wherein the controller is configured to determine an optimal arrangement of the one or more mass elements relative to the pulley system based on the distance measured by the one or more distance sensors prior to the impact of the subject with the surface.

5. The energy absorption system of claim 4, wherein the controller determines the optimal arrangement based on a velocity of the subject relative to the surface and an angle of impact of the subject with the surface as determined from the distance measured by the one or more distance sensors prior to the impact.

6. The energy absorption system of claim 2, wherein the one or more distance sensors include at least one optical sensor.

7. The energy absorption system of claim 6, wherein the at least one optical sensor comprises a laser sensor.

8. The energy absorption system of claim 2, wherein the one or more distance sensors include at least one sonar sensor.

9. The energy absorption system of claim 1, further comprising one or more force sensors, wherein the controller is configured to determine a timing of the impact according to a force measured by the one or more force sensors.

10. The energy absorption system of claim 9, wherein the one or more force sensors comprise at least one strain gauge.

11. A method of absorbing an impact energy imparted to a subject upon landing on a surface, the method comprising:
    measuring a distance between the subject and the surface;
    prior to an impact of the subject with the surface, mechanically moving one or more mass elements via a pulley system and a multi-axis joint connecting the pulley system to the subject to an optimal arrangement based on the measured distance; and
    upon the impact of the subject with the surface, moving the one or more mass elements toward the surface.

* * * * *